Patented June 24, 1930

1,767,230

UNITED STATES PATENT OFFICE

ARNOLD SHEPHERDSON AND ANTHONY JAMES HAILWOOD, OF MANCHESTER, ENGLAND, ASSIGNORS TO BRITISH DYESTUFFS CORPORATION LIMITED, OF MANCHESTER, ENGLAND

1-HYDROXYLAMINO-8-SULPHO-ANTHRAQUINONE

No Drawing. Application filed March 28, 1927, Serial No. 179,182, and in Great Britain April 26, 1926.

This invention relates to the reduction of 1-nitroanthraquinone-8-sulphonic acid and its salts and to a new product obtained thereby.

We have found that when 1-nitroanthraquinone-8-sulphonic acid is reduced in neutral or alkaline solution under less drastic conditions than are required for reduction to 1-aminoanthraquinone-8-sulphonic acid, there is obtained a compound having the probable constitution

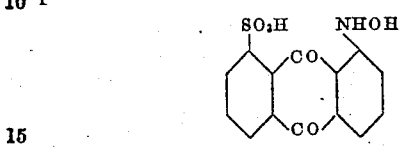

i. e. 1-hydroxylaminoanthraquinon-8-sulphonic acid. This new product is a valuable intermediate for the production of anthraquinone dyes and intermediates for dyes. For example by the action of mineral acids it is isomerized to 1:2:8- and 1:4:8-aminohydroxyanthraquinone sulphonic acids; and by boiling with caustic alkalis it is converted into indanthrone (N-dihydro-1:2:1':2''-anthraquinone azine) disulphonic acid, which may be desulphonated by electrolytic reduction in a divided cell, in alkaline solution by the method described in a co-pending application of one of us (Hailwood, Serial No. 153,473, filed December 8, 1926), thus providing a new route to indanthrone.

Our invention is illustrated but not limited by the following example, in which the parts are by weight.

*Example:* 20 parts of sodium 1-nitroanthraquinone-8-sulphonate are stirred at laboratory temperature with 250 parts of water. A solution of 27 parts crystallized sodium sulphide, dissolved in 200 parts water are added, and the mixture is agitated until no reaction for sulphide is obtained on testing a sample. The green solution is filtered. The filtrate, acidified with acetic acid, becomes red and after a time deposits a greyish purple precipitate of 1-hydroxylaminoanthraquinone-8-sulphonic acid which may be dried at moderate temperatures without decomposition. The compound is moderately soluble in cold water to an orange-red solution, and dissolves easily giving a deep green colour in cold caustic soda solution. In concentrated sulphuric acid it becomes yellow and is converted into an aminohydroxyanthraquinone sulphonic acid (1:2:8- or 1:4:8- or a mixture of both), which dissolves in alkaline solutions giving a violet color.

Amongst other reducing agents which lead to the same result may be mentioned zinc dust and ammonium chloride, glucose and sodium hydroxide, etc.

What we claim and desire to secure by Letters Patent is:—

As a new material a substance having the probable structure

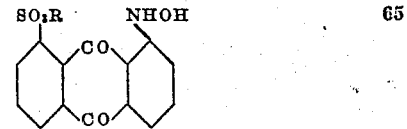

in which R stands for H or a metallic atom, which substance, in the form of the free acid, is a greyish purple powder, is moderately soluble in water to an orange red solution, dissolves easily with a deep green colour in cold caustic soda solution, dissolves in concentrated sulphuric acid, becoming yellow, and is converted by boiling aqueous alkali into a sulphonated indanthrone.

In testimony whereof we affix our signatures.

ARNOLD SHEPHERDSON.
ANTHONY JAMES HAILWOOD.